United States Patent [19]
Kendrick

[11] 3,969,737
[45] July 13, 1976

[54] ELECTRONIC FLASH UNIT FOR CAMERAS ADAPTED TO RECEIVE FLASHBULBS

[75] Inventor: Edward Summers Kendrick, Rochester, N.Y.

[73] Assignee: Eastman Kodak Company, Rochester, N.Y.

[22] Filed: Aug. 1, 1974

[21] Appl. No.: 493,573

[52] U.S. Cl. .............................. 354/141; 315/241 P; 354/145
[51] Int. Cl.² ........................................ G03B 15/03
[58] Field of Search ........................... 354/141, 145; 315/241 R, 241 P

[56] References Cited
UNITED STATES PATENTS

| | | |
|---|---|---|
| 3,424,071 | 1/1969 | Schwahn .............................. 354/141 |
| 3,559,548 | 2/1971 | Ackerman .......................... 354/141 |
| 3,559,549 | 2/1971 | Ackerman .......................... 354/141 |
| 3,842,428 | 10/1974 | Kawasaki ............................ 354/145 |
| 3,919,593 | 11/1975 | Nakamura ...................... 315/241 P |

Primary Examiner—Joseph F. Peters, Jr.
Assistant Examiner—James LaBarre
Attorney, Agent, or Firm—Dennis P. Monteith

[57] ABSTRACT

An electronic flash unit for use with cameras having a flash lamp firing mechanism adapted to fire flash lamps in timed relation with the operation of a camera shutter. An electronic time delay circuit coupled to the flash lamp firing mechanism energizes a flash unit trigger circuit to fire the flashtube in synchronism with the camera shutter. A voltage-sensitive switching element renders the delay circuit operative once the flash unit firing capacitor is charged above a predetermined level. With this arrangement, the flash-firing mechanism cannot energize the flashtube trigger circuit when there is insufficient firing capacitor voltage.

8 Claims, 2 Drawing Figures

ELECTRONIC FLASH UNIT FOR CAMERAS ADAPTED TO RECEIVE FLASHBULBS

BACKGROUND OF THE INVENTION

1. Field of the Invention

This invention relates to an electronic flash unit for use with cameras having a flash lamp firing mechanism adapted to fire flash lamps in timed relation with the operation of a camera shutter.

2. Description of the Prior Art

In photographic cameras which are adapted for flash photography by firing or igniting a flash lamp or flashbulb, various arrangements are known for firing the flash lamp in timed relation with the operation of the camera shutter control mechanism. The light intensity from a flash lamp is transient and, typically, is of a duration of approximately 40 milliseconds (ms), the peak light intensity being reached within approximately 10 ms followed by a gradual decay. Because the light from flash lamps is of a relatively long duration and because flash lamps do not reach peak light intensity instantaneously, the timing between the opening (and closing) of a camera shutter and the firing of the flash lamp, although important, is not severely limited. In some flash cameras, the shutter may begin to open before the flash lamp is energized to allow for dynamic shutter delays occasioned in the period to allow the shutter to initially open whereas in other cameras the flash lamp may actually be fired prior to actuation of the shutter to permit the flash light to approach its peak light intensity before the shutter is initially opened.

On the other hand, electronic flash units, which may have a light source such as a xenon-filled flashtube, have a very short duration light output on the order of a millisecond and reach peak light intensity almost instantaneously. Therefore, it is not feasible to fire a flash unit before the camera shutter is actuated. Care must be taken to fire a flash unit after the camera shutter is actuated to allow for mechanical delays associated with the shutter to assure that the shutter is opened before the flashtube is fired.

To provide an electronic flash unit adapted to be mounted or coupled to a flash lamp receiving socket operatively associated with the camera and to be fired from a flash lamp firing mechanism located in the camera presents the problem of synchronizing the shutter opening and flash unit firing operations. This problem is particularly acute when the flash lamp firing mechanism is of the type which is actuated prior to the occurrence of shutter opening movement.

It is known in the prior art to provide an electronic flash unit for use with cameras adapted to receive and to fire flash lamps, and in which the flash unit is fired from the same source in the camera used to fire the flash lamp. In particular, it is known in the prior art to fire a flash unit from a camera having a flash lamp firing mechanism which is actuated prior to the initiation of shutter opening movement. For example, U.S. Pat. No. 3,559,548, issued to M. S. Ackerman on Feb. 2, 1971, and U.S. Pat. No. 3,521,540, issued to W. C. Cavallo on July 21, 1970, disclose a rechargeable stroboscopic flash attachment adapted to be connected to a flash lamp receiving receptacle of a camera of the type having a shutter delay mechanism for delaying operation of the camera shutter until the flash lamp normally used with the camera has reached its peak light intensity. In the Ackerman patent the flash unit is electrically connected to a pair of flash lamp terminals and includes an electronic time delay circuit which provides a flash ignition signal to fire the flashtube a fixed, predetermined time period after a flash lamp would normally be fired. The delay is related to the shutter delay period so that the strobe is fired when the shutter is opened.

In the Cavallo patent, a shutter activating signal having a duration related to the delay induced by the shutter delay mechanism is utilized to energize an input relay. While the relay is energized, a control capacitor is charged. When the relay is de-energized, which occurs upon termination of the shutter activating signal, the relay contacts are switched which causes the capacitor to discharge and trigger the flashtube ON.

SUMMARY OF THE INVENTION

One of the objects of the present invention is to provide an improved electronic flash unit for use with a camera of the type adapted to fire flash lamps.

Another object of the invention is to provide an electronic flash unit of the aforementioned type, the flash unit having an improved circuit for synchronizing the operation of the camera shutter with the firing of the flashtube.

A yet another object of the present invention is to provide an improved electronic flash unit having an electronic time delay circuit for synchronizing the operation of the camera shutter and the flashtube, the flash unit further including means for signaling the operational readiness of the flashtube while automatically rendering the delay circuit effective to synchronize the shutter with the flashtube.

A still further object of the instant invention is to provide switching means operatively associated with the time delay circuit and responsive to the strobe firing capacitor voltage for automatically resetting the strobe trigger circuit for subsequent flashtube energization.

A still further object of the instant invention is to provide an improved electronic flash unit of the aforementioned type which employs a time delay circuit that can be efficiently manufactured at a low cost.

Another object of the instant invention is to provide an improved electronic flash unit for use with cameras of the type adapted to fire flash lamps, which flash unit can operate relatively independent of the characteristics of the flash lamp firing signal.

In accordance with the above objects, there is provided an electronic flash unit adapted to be fired from a camera having a flash lamp firing mechanism for energizing a received flash lamp in timed relation with the operation of the camera shutter, the flash unit comprising means responsive to a flash lamp energization signal for producing a control signal in timed relation to the occurrence of the energization signal, means for enabling the control signal producing means effective to produce the control signal once the flash unit firing capacitor is charged to a predetermined level, and electronic switching means responsive to the control signal for rendering the flash unit trigger circuit conductive to thereby effect a flash unit firing operation.

The invention, and its objects and advantages, will become more apparent in the detailed description of a preferred embodiment presented below.

BRIEF DESCRIPTION OF THE DRAWING

In the detailed description of a preferred embodiment of the invention presented below, reference is made to the accompanying drawing, in which.

DESCRIPTION OF A PREFERRED EMBODIMENT

Because electronic flash units are well known, the present description will be directed in particular to elements forming part of, or cooperating more directly with, apparatus in accordance with the present invention. It is to be understood that flash unit elements not specifically shown or described may take various forms well known to those having skill in the art.

Figure 1:
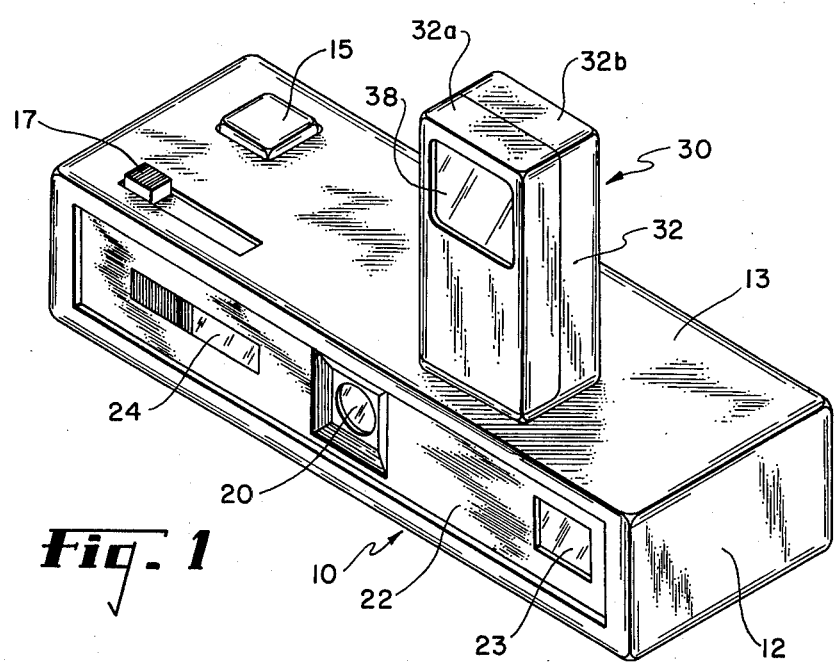
FIG. 1 illustrates a perspective view of an electronic flash unit, which includes the present invention, mounted on a camera of the type adapted to receive and to fire flash lamps.

There is shown in FIG. 1 of the drawing a camera, designated generally with the numeral 10, having an enclosed generally light-tight housing 12, within the top wall 13 of which is located a shutter release member 15 and a knurled focus setting button 17 which is movable for focusing a taking lens (not shown) mounted within the housing in alignment with exposure aperture 20. Camera 10 also includes a shutter mechanism (not shown) located to regulate the amount of scene light projected through exposure aperture 20, the shutter being actuatable in response to a camera operator depressing shutter release member 15. Mounted within faceplate 22 is a viewfinder 23 and a window 24 behind which is located a light-sensitive device (not shown) such as a photocell for sensing the intensity of the scene light. Camera 10 may also include an electronic exposure control circuit operably associated with the photocell so as to automatically control the amount of scene light passing through aperture 20 once the shutter is opened under the influence of release member 15.

An electronic flash unit 30 is mounted on camera 10 by means known in the art such as a mounting base (not shown) which depends from the bottom of housing 32 and is adapted to fit snugly into a flash-receiving shoe or receptacle (also not shown) located within top wall 13. Flash unit 30 is electrically connected to camera 10 as is shown schematically in FIG. 2 by a pair of electrical conductive strips 33a, 33b located in the flash base and spaced for making contact, respectively, with corresponding spaced contacts 34a, 34b located within the camera flash-receiving receptacle. Contacts 34a, 34b are connected to a flash-firing mechanism 35, shown in block form, which mechanism is of the kind normally utilized for igniting a photographic flash lamp or flashbulb. Flash-firing mechanisms are well known in the art and may, for example, include apparatus for electrically firing the flash lamp which comprises a low voltage source and associated circuitry arranged to produce a flash lamp firing pulse in timed relation to the actuation of the camera shutter mechanism or, on the other hand, may include a piezoelectric crystal located and arranged so as to produce a high voltage impulse in timed relation to shutter opening movement. Arrangements of the latter type have been described in several patents, one of which is U.S. Pat. No. 2,972,937 issued to C. G. Suits on Feb. 28, 1961, entitled FLASH APPARATUS.

Figure 2:
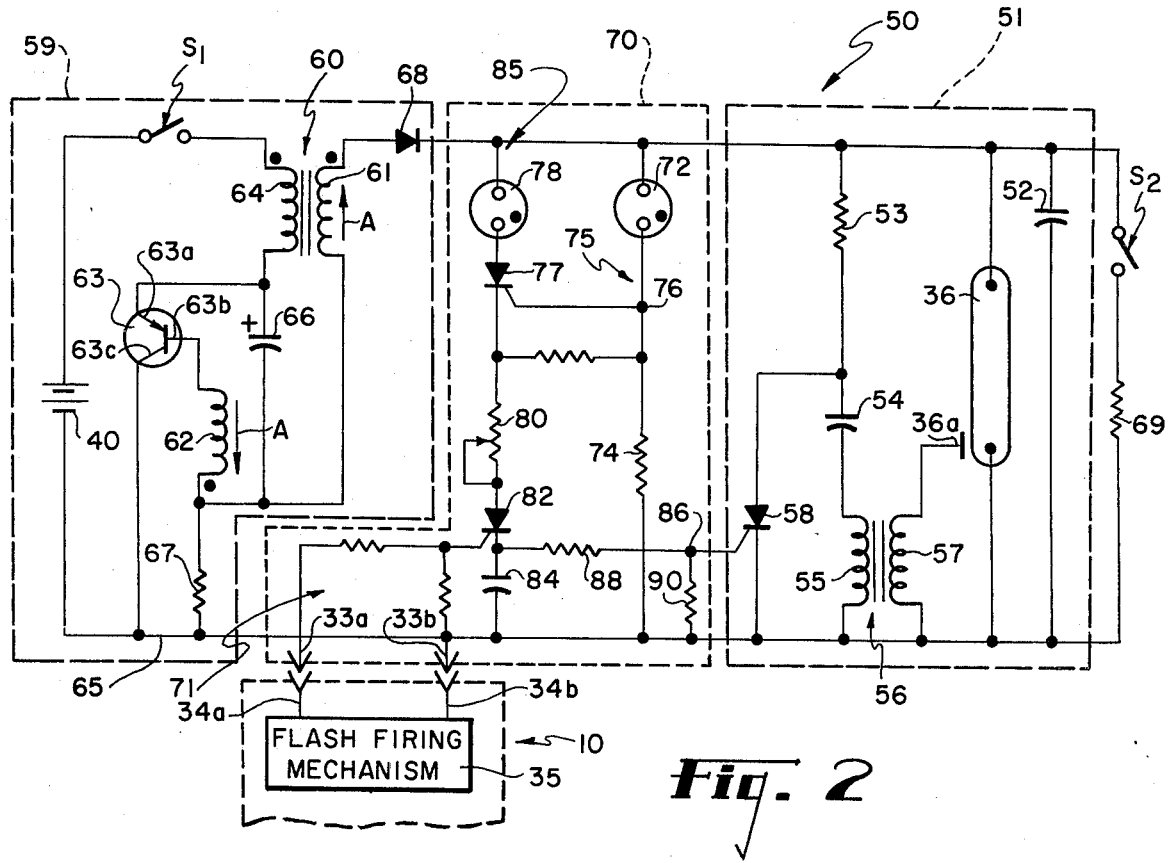
FIG. 2 is a schematic of an electronic circuit included in the flash unit shown in FIG. 1, which circuit in accordance with the teachings of the instant invention operates to synchronize the camera shutter with the firing of the flashtube.

Flash unit 30 includes an electronic flashtube 36, also shown schematically in FIG. 2, mounted within housing 32 in optical communication with a flash window 38. Housing 32 is formed of a pair of complimentary shaped portions 32a, 32b which are releasably coupled together by suitable means such as screws (not shown) to permit an operator access to the inside of the flash unit.

A spring loaded plunger-type switch member S1, shown in FIG. 2, protrudes from the bottom wall of housing 32 and is closed when flash unit 30 is properly inserted into the aforementioned flash-receiving receptacle so as to connect flash unit battery 40, for the purpose of operating flashtube 36.

To fire flashtube 36 in response to each flash lamp firing signal generated by camera 10 at contacts 34a, 34b and in synchronism with the camera shutter mechanism, electronic flash unit 30 includes an internal circuit denoted generally 50, as shown in FIG. 2, which circuit constitutes the principal part of the instant invention and will be readily understood by those skilled in the electronics art from the following description read in conjunction with the drawing.

As is shown in FIG. 2, circuit 50 includes a conventional electronic flash circuit 51 having a main firing capacitor 52 connected in parallel across flashtube 36 to provide the firing voltage for the flashtube. This conventional circuit further includes a fixed resistor 53, a trigger capacitor 54 of relatively small capacitance, and the primary winding 55 of an ignition transformer 56, the resistor, trigger capacitor and primary being interconnected to form a series circuit which is in parallel across flashtube 36. Ignition transformer 56 has its secondary winding 57 connected in series to trigger electrode 36a as shown.

A silicon controlled rectifier (SCR) 58 connected in parallel across trigger capacitor 54 and primary 55, as shown, constitutes means for rendering the flash trigger circuit conductive to fire flashtube 36. As is known in the electronics art an SCR is an electronic switching device which is normally non-conducting but which is rendered conductive when a momentary pulse of current is caused to flow into its gate electrode and which remains conductive even after gate electrode current ceases as long as the magnitude of the current signal that flows from anode to cathode is above a predetermined level. With SCR 58 interconnected as shown, primary winding 55 forms a series circuit with trigger capacitor 54 and the anode to cathode junction of SCR 58, which circuit operates to discharge trigger capacitor 54 through the primary winding when the SCR conducts.

To obtain an adequate voltage potential for operating flashtube 36, a voltage converter circuit denoted generally 59 is provided which is adapted to step-up or convert the relatively low voltage of battery 40 to a level sufficient to adequately charge firing capacitor 52 and trigger capacitor 54. Voltage converter 59 includes a transformer 60, the secondary winding of which comprises a high voltage winding 61 and a low voltage winding 62, and a transistor 63, the emitter electrode 63a being connected to transformer primary 64 as shown, base electrode 63b being connected in series to the low voltage winding 62 and collector electrode 63c being connected to common conductor 65. A control capacitor 66 is connected in parallel across the emitter-base junction of transistor 63 and winding 62 as shown and operates due to the high impedance combination of battery 40, current limiting resistor 67 and primary 64 to provide positive feedback to emitter electrode 63a of the base electrode current.

When switch S1 is closed, current is caused to flow from battery 40 through primary 64. Initially, the portion of the battery voltage which appears across primary 64 is relatively small and only a slight amount of current is caused to flow into emitter electrode 63a and to charge capacitor 66. However, with a voltage across primary 64, a voltage is induced across the secondary windings under the influence of transformer 60 and current is caused to flow through each of the secondary windings in the direction of arrow A. As this occurs, a portion of the current through winding 62 is fed back through capacitor 66 and into emitter electrode 63a. As this happens, transistor 63 is rapidly driven into saturation and the voltage across primary 64 approaches a constant equal approximately to the level of the battery voltage. For this condition to be maintained, the flux produced by primary coil 64 must increase linearly, or, in other words, current which continually increases in amplitude must be drawn from battery 40. Since battery current is limited, constantly increasing battery current is maintained only for a brief duration during which capacitor 66 is charged with a polarity as shown, and a high voltage pulse is produced across winding 61 which pulse operates to cause control diode 68 to conduct and to thereby charge firing capacitor 52 while at the same time charging trigger capacitor 54 through resistor 53 and the primary winding of transformer 56.

Once battery current ceases to increase, the flux field produced by winding 61 relapses and consequently a voltage of opposite sense is instantaneously induced across the secondary windings of transformer 60. When this happens, it is necessary, in order to fully understand the operation of circuit 59, to consider two conditions which occur. First, because of the series interconnection between control diode 68 and winding 61, the diode does not conduct and trigger capacitor 54 and firing capacitor 52 are not charged. Secondly, capacitor 66 discharges through transistor 63 to thereby cause base current to flow through secondary winding 62 in the direction of arrow A. As this happens, positive feedback again occurs through capacitor 66 and the cycle is repeated. The net result is that a series of positive, repetitive pulses is produced across winding 61 which repetitively turn diode 68 ON and charge the capacitors 52, 54. The repetition rate of the pulsed signal is selectively controlled by the value of the elements of circuit 59 and capacitors 52, 54 are charged to a voltage level, which in accordance with a preferred embodiment of the invention is approximately 250 volts for the trigger capacitor and approximately 300 volts for the firing capacitor.

As a safety means for discharging these relatively high voltages from capacitore 52, 54 on such occasions as when the flash unit operator may deem it necessary to separate housing portions 32a, 32b for access to the inside of flash unit 30, there is provided a bleeder resistor 69 connected in series to a normally open switch 52, the series combination being connected in parallel across firing capacitor 52. Switch S2 may for example comprise a resilient conductive strip, one end of which is connected to resistor 69 and the other end of which is held out of contact with capacitor 52 by means such as a rigid finger member (not shown) connected internally to one portion of housing 32. When the housing is opened, the finger is displaced to permit the conductive strip to contact capacitor 52 so as to discharge the capacitors 52, 54 through resistor 69 to conductor 65.

The emission of light from flashtube 36 is commenced upon the application of a voltage signal to trigger electrode 36a. This condition occurs when SCR 58 is rendered conductive whereby trigger capacitor 54 discharges through primary 55. As this happens a high voltage trigger pulse, due to transformer 56, is applied to trigger electrode 36a, which causes some of the xenon in the tube to be ionized. When this ionization occurs, the inter-electrode resistance of flashtube 36 is sharply reduced, and firing capacitor 52 is caused to rapidly discharge through the tube until a capacitor voltage level hereinafter referred to as the voltage necessary to sustain conduction is reached. The result is a brief flash, on the order of a fraction of a millisecond, of high intensity light.

In accordance with the teachings of the present invention, circuit 50 includes an electronic shutter-flash synchronization circuit, denoted generally 70, operatively coupled between the contacts 34a, 34b of camera flash-firing mechanism 35 and flash circuit 51 for controlling the firing of flashtube 36 in synchronism with the opening of the camera shutter mechanism. Shutter-flash synchronization circuit 70 includes a current limiting input circuit denoted generally 71, and a voltage-sensitive indicator such as a neon lamp 72 connected in series with a fixed resistor 74, the series combination forming the branch 75 connected in parallel across firing capacitor 52. The operational parameters of this series circuit are selectively controlled such that when firing capacitor 52 is charged to a level sufficient to properly fire flashtube 36, lamp 72 is caused to glow so as to be visible through a flash-ready window (not shown) located in the rear of flash unit 30 to indicate to a camera operator the flash unit is ready to be fired. Furthermore, when lamp 72 glows, the lamp and resistor 74 operate as a voltage divider with the voltage signal that appears at terminal 76 operating to supply gate current to an SCR 77.

SCR 77 in combination with flash-ready lamp 72 constitutes means for enabling an electronic time delay circuit, described in detail hereinafter, to be turned ON, once flash circuit 51 is readied for firing, to accomplish the aforementioned synchronous operation. With this arrangement, a camera operator who fails to realize firing capacitor 52 is not sufficiently charged to fire flashtube 36 and who thereby inadvertently actuates the camera flash-firing mechanism, cannot unnecessarily cause trigger capacitor 54 to discharge. How this result is achieved will become readily apparent from the detailed description which follows.

Connected in series with SCR 77 is a voltage sensitive neon lamp 78, a variable resistor 80, an SCR 82 and a timing capacitor 84, the aforementioned components being interconnected so as to form a branch or series circuit 85 in parallel with the branch 75. The lamp 78 operates as a current switch with the operational characteristics thereof being selected so that the lamp 78 ceases to glow when the voltage on firing capacitor 52 approaches the aforementioned firing capacitor voltage necessary to sustain conduction. With this arrangement, when capacitor 52 discharges through the flashtube, lamp 78 is caused to turn OFF before flashtube 36 is extinquished. When the former condition occurs, branch 85 is effectively open circuited and ceases to conduct. This switching operation is necessary to render branch 85 temporarily non-conductive, once the flash is triggered ON, to set or initialize the branch 85 for subsequent flash firings.

The resistor 80 and timing capacitor 84 operate in combination as an electronic RC delay which induces a delay proportional to the product of the capacitance and the resistance, which is variable as indicated in FIG. 2.

When shutter release member 15 is actuated under the influence of operator finger pressure, a flash-firing signal is produced at contacts 34a, 34b, which signal operates to supply gate current to SCR 82 through input circuit 71. Assuming firing capacitor 52 is sufficiently charged so as to turn flash-ready lamp 72 ON and to thereby render SCR 77 conductive, the gate current causes SCR 82 to turn ON and branch 85 to conduct current. As this happens, timing capacitor 84 charges at a rate proportional to the product of resistor 80 and the timing capacitor. As capacitor 84 charges to a predetermined voltage level, a voltage signal proportional thereto is produced at terminal 86, which signal is adequate to supply gate current to SCR 58 and to thereby cause that SCR to conduct. When the latter condition occurs, substantially the entire voltage across trigger capacitor 54 is discharged through SCR 58 and across primary coil 55, which condition initiates a flash as described hereinbefore.

As firing capacitor 52 discharges through flashtube 36, first lamp 72 is turned OFF, then lamp 78 ceases to conduct, both switching operations occurring as the firing capacitor voltage drops.

When lamp 78 is turned OFF, branch 85 ceases to conduct current. When this happens, the voltage across timing capacitor 84 discharges through resistors 88, 90 and the gate electrode of SCR 58 and circuit 70 is initialized for subsequent flash firings.

It can be seen that circuit 70 operates to delay the firing of flashtube 36 for a time interval after a flash lamp firing signal is produced, which time interval is settable according to the resistance value selected for resistor 80. In a typical situation, this time interval would be on the order of 10 milliseconds to allow for dynamic delays during shutter opening movement as well as any time interval which would exist if the shutter is actuated so as to be opened after the flash-firing circuit is energized.

Furthermore, it can be seen from the description hereinbefore that due to the operational interrelationship between flash-ready lamp 72 and branch 85 that the flash lamp firing signal cannot prematurely ionize the xenon in the flashtube in the absence of adequate voltage across firing capacitor 52. With the circuitry constituting the instant invention, battery drain and circuit malfunction from inadvertent flashfiring operations is eliminated.

It shall be understood that although the schematic circuit shown in FIG. 2 and described herein in association with a camera flash-firing mechanism for firing a flash lamp with an electrical signal, included within the scope of the invention are cameras having flash-firing mechanisms 35 of the type which fire a flash lamp mechanically such as by means of a percussive flash-firing mechanism. Firing mechanisms of this type have during the recent past appeared in many commercially available cameras and are shown and described in several U.S. Patents, one of which is U.S. Pat. No. 3,661,063 issued to D. E. Beach on May 9, 1972, entitled MECHANISM FOR SENSING THE CONDITION OF A PERCUSSIVE FLASH DEVICE AND FOR EFFECTING SYNCHRONOUS PERCUSSIVE FLASH EXPOSURES, and assigned to the assignee of the instant invention. A percussive flash lamp firing mechanism may include a high energy lever released from a set position in response to displacement of a shutter release member, and operates to actuate the camera shutter and release a flash lamp striker member to percussively fire the lamp in synchronism with shutter operating movement. To fire an electronic flash unit with a camera adapted to percussively fire flash lamps, the striker member may be utilized to close a switch connected to the flash unit battery and the input terminals to the flash-shutter synchronization circuit whereby an electrical signal or pulse, similar to the electrical flash-firing mechanism, is applied to the flash input contacts 33a, 33b.

In accordance with a preferred embodiment of the instant invention, there has been described an improved electronic flash unit for cameras adapted to receive and to fire flash lamps which flash unit accomplishes the aforementioned objectives.

This invention has been described in detail with particular reference to a preferred embodiment thereof, but it will be understood that variations and modifications can be effected within the spirit and scope of the invention.

I claim:

1. In an improved electronic flash unit having a flashtube, a flashtube trigger circuit including a trigger capacitor for initiating a flash-firing operation, a flash firing capacitor for producing a sustained flash following flash-firing initiation, and means for connecting said trigger and firing capacitors to a source of electrical potential for controllably charging said trigger and firing capacitors, said electronic flash unit further including input means for coupling said flash unit to a camera having a shutter and a flash lamp firing mechanism of the type which produces a flash lamp energization signal in response to actuation of the camera in timed relation to operation of the camera shutter, the improvement comprising:

a. circuit means, coupled to said input means, having (1) a non-conductive state for electrically isolating said input means from said trigger circuit and (2) a conductive state for producing a time-delay signal a predetermined time interval following the occurrence of the energization signal, said time interval being functionally related to the timed relation between the flash lamp energization signal and operation of the camera shutter;

b. switch means responsive to (1) said firing capacitor being charged to a level sufficient to flash said flashtube, and (2) the occurrence of the energization signal for switching said circuit means into its conductive state; and c. switching means responsive to said timedelay signal for permitting said flashtube trigger circuit to trigger said flashtube ON.

2. In an improved electronic flash unit having a flashtube, a flashtube trigger circuit including a trigger capacitor for initiating a flash-firing operation, a flash-firing capacitor for producing a sustained flash following flash-firing initiation, and means for connecting said trigger and firing capacitors to a source of electrical potential for controllably charging said trigger and firing capacitors, said electronic flash unit further including an electrical input circuit for electrically coupling said flash unit to a camera having a shutter and a flash lamp firing mechanism of the type which produces a flash lamp energization signal in response to actuation of the camera prior to operation of the camera shutter, the improvement comprising:
  a. circuit means interconnecting said electrical input circuit and said trigger circuit, said circuit means having (1) a first non-conductive state for electrically isolating said input circuit from said flashtube trigger circuit to prevent the energization signal from rendering said trigger circuit effective to trigger said flashtube ON, and (2) a second conductive state for producing a control signal a predetermined time interval following the initiation of the flash lamp energization signal, said time interval being proportional to the time period between the occurrence of the flash lamp energization signal and operation of the camera shutter;
  b. flash-ready switch means responsive to the charge on said firing capacitor and having (1) a first, non-conductive state for maintaining said current means in said non-conductive state while said firing capacitor is charged to a level insufficient to flash said flashtube and (2) a second, conductive state in response to said firing capacitor being charged to a level sufficient to flash said flashtube for permitting said circuit means to assume its conductive state in response to the occurrence of the flashlamp energization signal; and
  c. electronic switching means responsive to said control signal for rendering said flashtube trigger circuit effective to trigger said flashtube ON.

3. An electronic flash unit as set forth in claim 2 wherein said flash-ready switch means further includes means for optically signaling that the charge on said firing capacitor is sufficient to flash said flashtube.

4. In an improved electronic flash unit having a flashtube, a flashtube trigger circuit including a trigger operation for initiating a flash-firing operation, a flash firing capacitor for producing a sustained flash following flash-firing initiation, and means for connecting said trigger and firing capacitors to a source of electrical potential for controllably charging said trigger and firing capacitors, said electronic flash unit further including input means for coupling said flash unit to a camera having a shutter and a flash lamp firing mechanism of the type which produces a flash lamp energization signal in response to actuation of the camera in timed relation to operation of the camera shutter, the improvement comprising:
  a. means operatively associated with said input means for producing a control signal having a particular parameter a predetermined time interval following the initiation of the flash lamp energization signal;
  b. voltage-sensitive switching means responsive to the voltage across said flash firing capacitor for rendering said control signal producing means conductive when the firing capacitor voltage is adequate to flash said flashtube;
  c. electronic switching means responsive to said control signal for rendering said flashtube trigger circuit effective to trigger said flashtube ON; and
  d. second voltage-sensitive switching means responsive to the discharge of said flash firing capacitor for rendering said control signal producing means non-conductive.

5. In an improved electronic flash unit having a flashtube, a flashtube trigger circuit including a trigger capacitor for initiating a flash-triggering operation, a flash firing capacitor for producing a sustained flash following flash-firing energization, and means for connecting said trigger and firing capacitors to a source of electrical potential for controllably charging said trigger and firing capacitors, said electronic flash unit further including input means for coupling said flash unit to a camera having a shutter and a flash lamp firing mechanism of the type which produces a flash lamp energization signal in response to actuation of the camera in timed relation to operation of the camera shutter, the improvement comprising:
  a. first electronic switching means having a gate electrode operatively associated with said flashtube trigger circuit for controlling triggering of said flashtube; and
  b. circuit means interconnecting said input means and said first electronic switching means, said circuit means including:
    i. means having a resistor and timing capacitor for producing a control signal having a particular amplitude in a time interval following initiation of the flash lamp energization signal proportional to the product of the resistance and capacitance value;
    ii. first voltage-sensitive means for producing a signal to render said control signal producing means effective to produce said control signal once said firing capacitor is charged above a predetermined level;
    iii. second electronic switching means having a gate electrode electrically coupled to said input means for permitting said timing capacitor to charge following initiation of the flash lamp energization signal; and
    iiii. second voltage-sensitive means having a non-conductive state for rendering said circuit means non-conductive, said second voltagesensitive means assuming said non-conductive state during a flashtube-firing operation to effectively open circuit said resistor and capacitor combination.

6. In an improved electronic flash unit having a flashtube, a flashtube trigger circuit including a trigger capacitor for initiating a flash-firing operation, a flash firing capacitor for producing a sustained flash following flash-firing initiation, and means for connecting said trigger and firing capacitors to a source of electrical potential for controllably charging said trigger and firing capacitors, said electronic flash unit further including input means for coupling said flash unit to a camera having a shutter and a flash-firing mechanism of the type which produces a flash lamp energization signal in response to actuation of the camera in timed relation to operation of the camera shutter, the improvement comprising:
  a. means defining an electrical circuit interconnecting said input means and said flashtube trigger circuit and having first and second parallel branches, said first branch comprising a voltage-sensitive switching element in series with a resistor, said first branch having a first, non-conductive state and a second, conductive state for producing a control signal, said conductive state occurring when a charge exists on said firing capacitor above a predetermined level, said second branch comprising first electronic switching means a resistor, a capacitor, second electronic switching means, and means for interconnecting said first and second electronic switching means, said resistor and said capacitor in a series configuration, said first electronic switching means having controllable gate means connected to said first branch for rendering said second branch conductive with the occurrence of said control signal, said second electronic switching means having controllable gate means coupled to said input means for rendering said second branch effective to charge said capacitor upon the presence of the flash lamp energization signal; and b. third electronic switching means having a gate electrode responsive to the voltage across said capacitor for rendering said trigger circuit conductive to effect a flash-firing operation.

7. An electronic flash unit as set forth in claim 6 wherein said electrical circuit defining means further includes means interconnecting said first and second branches for permitting said first electronic switching means to remain electrically conductive while said second electronic switching means is nonconductive.

8. An electronic flash unit as set forth in claim 7 wherein said second branch further includes voltage-sensitive switching means for rendering said first electronic switching means non-conductive when the firing capacitor voltage is below a particular level.

* * * * *

UNITED STATES PATENT OFFICE
CERTIFICATE OF CORRECTION

PATENT NO. : 3,969,737
DATED : July 13, 1976
INVENTOR(S) : Edward Summers Kendrick It is certified that error appears in the above-identified patent and that said Letters Patent are hereby corrected as shown below:

Col. 5, Line 54  Please delete "capacitore" and substitute therefor --capacitors--

Col. 5, Line 59  Please delete "52" and substitute therefor --S2--

Col. 8, Line 54  Please delete "timedelay" and substitute therefor --time-delay--

Col. 9, Line 18  Please delete "current" and substitute therefor --circuit--

Col. 10, Line 36  Please delete "voltagesensitive" and substitute therefor --voltage-sensitive--

Signed and Sealed this

Twenty-sixth Day of October 1976

[SEAL]

Attest:

RUTH C. MASON
*Attesting Officer*

C. MARSHALL DANN
*Commissioner of Patents and Trademarks*